(12) United States Patent
Niimi

(10) Patent No.: US 6,635,993 B1
(45) Date of Patent: Oct. 21, 2003

(54) JOINED BODIES, HIGH-PRESSURE DISCHARGE LAMPS AND A METHOD FOR MANUFACTURING THE SAME

(75) Inventor: Norikazu Niimi, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/326,720

(22) Filed: Jun. 7, 1999

(30) Foreign Application Priority Data

Aug. 26, 1998 (JP) ............................................ 10-254650

(51) Int. Cl.$^7$ ......................... H01J 61/36; H01J 61/35; H01J 17/20

(52) U.S. Cl. ..................... 313/623; 573/624; 573/625; 573/635

(58) Field of Search ................................ 313/573, 574, 313/493, 634, 635, 636, 624, 625, 626, 623; 445/22, 23, 26, 27, 28; 65/59.1, 138, 154; 220/2.1 A, 2.3 A

(56) References Cited

U.S. PATENT DOCUMENTS

| | | | | |
|---|---|---|---|---|
| 3,737,977 A | * | 6/1973 | Jorgensen | 65/59.1 X |
| 4,004,173 A | * | 1/1977 | Rigden | 313/624 X |
| 4,162,151 A | * | 7/1979 | Bhalla | 65/42 |
| 5,424,608 A | | 6/1995 | Juengst et al. | |
| 5,532,552 A | * | 7/1996 | Heider et al. | 313/623 |
| 5,552,670 A | | 9/1996 | Heider et al. | |
| 6,020,685 A | * | 2/2000 | Wei et al. | 313/625 |
| 6,066,918 A | * | 5/2000 | Suzuki et al. | 313/623 |
| 6,392,345 B1 | * | 5/2002 | Niimi et al. | 313/623 |

FOREIGN PATENT DOCUMENTS

| | | | |
|---|---|---|---|
| EP | 0 452 275 | 10/1991 | |
| EP | 0 751 549 A1 | 1/1997 | |
| FR | 2 482 772 | 11/1981 | |
| JP | 53-33209 | 3/1978 | ............. C03C/3/12 |
| JP | 55042228 | 3/1980 | |
| JP | 58-204880 A | 11/1983 | ............. C04B/37/00 |
| JP | 59-152275 A | 8/1984 | ............. C04B/37/02 |
| JP | 61003809 | 1/1986 | |
| JP | 61-201676 A | 9/1986 | ............. C04B/37/02 |
| JP | 62-56380 A | 3/1987 | ............. C04B/37/02 |
| JP | 1-099775 A | 4/1989 | ............. B23K/1/20 |
| JP | 01212283 | 8/1989 | |
| JP | 1-236573 A | 9/1989 | ............. H01J/61/36 |
| JP | 1-236575 A | 9/1989 | |
| JP | 03103369 | 4/1991 | |
| JP | 5-94945 | 12/1993 | ............. H01J/61/36 |
| JP | 06126472 | 5/1994 | |
| JP | 6-318435 | 11/1994 | |
| JP | 7-176296 | 7/1995 | |
| JP | 7-247188 | 9/1995 | |
| JP | 8-253373 A | 1/1996 | ............. C04B/37/02 |
| JP | 8-273616 A | 10/1996 | ............. H01J/61/36 |

* cited by examiner

*Primary Examiner*—Sandra O'Shea
*Assistant Examiner*—Peter Macchiarolo
(74) *Attorney, Agent, or Firm*—Burr & Brown

(57) ABSTRACT

A joined structure and joining method of a member of a ceramics or a cermet and a member of a metal such as molybdenum, in which the members may be joined with a high strength, the joined structure has improved air-tightness and resistance to corrosion and repeated thermal cycles does not result in the fracture of the joined structure.

A joined body comprises a joining portion 6 interposed between a first member, made of a metal, and a second member 4, made of a ceramics or a cermet, for joining the first and second members. The joining portion 6 comprises main phase 14 contacting the first member and an intermediate glass layer 13 existing between the second member 4 and the main phase 14. The main phase 14 is composed of a porous bone structure 15, with open pores and made of a sintered product of metal powder, and glass phase 10 impregnated into the open pores in the porous bone structure. Preferably, the intermediate glass layer 13 and impregnated glass phase 10 is composed of glasses of the substantially same composition.

17 Claims, 15 Drawing Sheets

JOINED BODIES, HIGH-PRESSURE DISCHARGE LAMPS AND A METHOD FOR MANUFACTURING THE SAME

BACKGROUND OF THE INVENTION

1. Field of the Invention

The present invention relates to a joined body, a method for manufacturing the same and particularly relates to a high pressure discharge lamp.

2. Description of the Related Art

A high pressure discharge lamp has a ceramic discharge tube with two end portions, in which sealing members (usually referred to as a ceramic plug) are inserted, respectively, to seal the respective end portions. A through hole is formed in each sealing member and a metal member, to which a predetermined electrode system is attached, is inserted within the through hole. An ionizable light-emitting material is introduced and sealed within the inner space of the discharge tube. Known high pressure discharge lamp includes a high pressure sodium vapor and metal halide lamps, the latter exhibiting more superior color coordination. The lamp may be used in high temperature condition by forming the discharge tube by a ceramic material.

In such discharge lamps, it is necessary to provide an air-tight seal between the end portion of the ceramic discharge tube and a member for supporting an electrode system. The ceramic discharge tube has a main body with a shape of a tube with two narrow ends, or a barrel, or a straight tube. The ceramic discharge tube is made of, for example, an alumina sintered body. The end portion of the ceramic discharge tube may be sealed, for example, by the following method disclosed in Japanese patent publication Kokai (Tokkaihei) 318,435/1994. A sealing member is inserted and supported in the end portion of the ceramic discharge tube. A through hole is formed in the longitudinal direction of the center axis of the sealing member. An elongate member for supporting an electrode system is inserted and fixed within the through hole. The sealing member is made of a cermet containing both of alumina and a metal constituting the member for supporting an electrode system in a predetermined ratio, so that the sealing member has a thermal coefficient between those of the electrode-system supporting member and ceramic discharge tube.

When producing such a sealing structure, the calcined bodies of the ceramic discharge tube and sealing member are designed so that the end portion of the discharge tube has an inner diameter smaller than that of the outer diameter of the sealing member, when the calcined bodies are sintered without inserting the calcined body of the sealing member within the end portion of the calcined body of the tube. Therefore, the sealing member is tightly clamped and held in the end portion of the ceramic discharge tube. The sealing member and the electrode system supporting member are similarly designed.

SUMMARY OF THE INVENTION

However, the inventor further examined the above sealing structure and found the following problems. That is, in this sealing structure, the sealing member and the electrode-system supporting member are sealed with each other by a pressure applied between them. However, considering that many and repeated cycles of turning-on and turning-off are applied on the structure and the difference of the thermal expansion coefficients thereof, it is necessary to further improve the reliability of the sealing structure. In particular, it is necessary to develop a sealing structure with high corrosion resistance and improved reliability when using a metal halide being highly corrosive.

That is, it is necessary to provide a joined structure, in which a ceramic discharge tube or a sealing member, for example made of alumina, and a metal member, for example made of molybdenum, may be joined with a high strength, the resulting joined structure has improved air-tightness and resistance to corrosion, and repeated cycles of turning-on and turning-off does not result in the fracture of the joined structure. Moreover, the sealing member may be made of a cermet. In such a case, the above properties are demanded for the joined structure of the sealing and metal members.

It is an object of the invention to provide a joined structure of a ceramic member or a cermet member and a member made of a metal such as molybdenum, in which the members may be joined with a high strength, the joined structure has improved air-tightness and resistance to corrosion and repeated thermal cycles does not result in the fracture of the joined structure, and to provide a method for manufacturing the same.

It is another object of the invention to apply such joined structure to a high pressure discharge lamp, for improving the resistance to a corrosive gas, such as a metal halide, improving the air-tightness, and for avoiding the fracture of the joined structure due to repeated cycles of turning-on and turning-off.

The present invention provides a joined body of a first member made of a metal and a second member made of a ceramics or a cermet, the joined body comprising a joining portion interposed between the first member and the second member for joining the first and second members, wherein the joining portion comprises main phase contacting the first member and an intermediate glass layer contacting the second member and existing between the second member and the main phase, the main phase being composed of a porous bone structure, with open pores and made of a sintered product of metal powder, and a glass phase impregnated into the open pores in the porous bone structure.

The present invention further provides a ceramic discharge lamp comprising a ceramic discharge tube with an inner space formed therein and end portions, the inner space being filled with an ionizable light-emitting material and a starter gas and an opening being formed within the end portion, an electrode system provided within the inner space, a sealing member with a through hole formed therein, a part of the sealing member being fixed within the opening of the ceramic discharge tube, and a metal member, wherein the metal member and the sealing member constitute the above air-tight joined body with the metal member being the first member and the sealing member being the second member.

The present invention further provides a ceramic discharge lamp comprising a ceramic discharge tube with an inner space formed therein and end portions, the inner space being filled with an ionizable light-emitting material and a starter gas and an opening being formed within the end portion, an electrode system provided within the inner space and a metal member, wherein the metal member and the ceramic discharge tube constitute the above air-tight joined body with the metal member being the first member and the ceramic discharge tube being the second member.

The invention further provides a method for manufacturing a joined body of a-first member made of a metal and-a second member made of a ceramics or a cermet, the method comprising the steps of: providing a porous bone structure, with open pores and made of a sintered product of metal powder, between the first member and the second member, and impregnating a glass, melted at a temperature lower than the melting point of the metal constituting the porous bone structure, into the open pores of the porous bone structure to produce a main phase composed of the porous bone structure and a glass phase made of the glass impregnated into the open pores, and to flow the melted glass between the second member and the main phase to produce a intermediate glass layer, so that the first member and second member is joined.

The objects, embodiments and advantages of the invention will be described below in detail referring to the attached drawings.

BRIEF DESCRIPTION OF THE DRAWINGS

FIG. 1(*b*) is a joined body after a glass material is melted.

DETAILED DESCRIPTION OF THE INVENTION

Figure 1A:
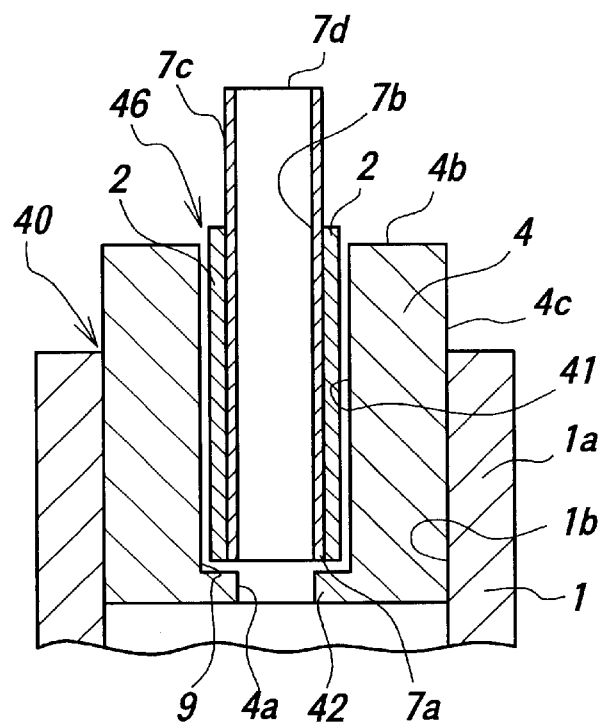
FIG. 1(*a*) is a cross sectional view schematically showing the state wherein a porous bone structure 2 is provided between a sealing member 4 and a metal member 7.
Figure 1B:
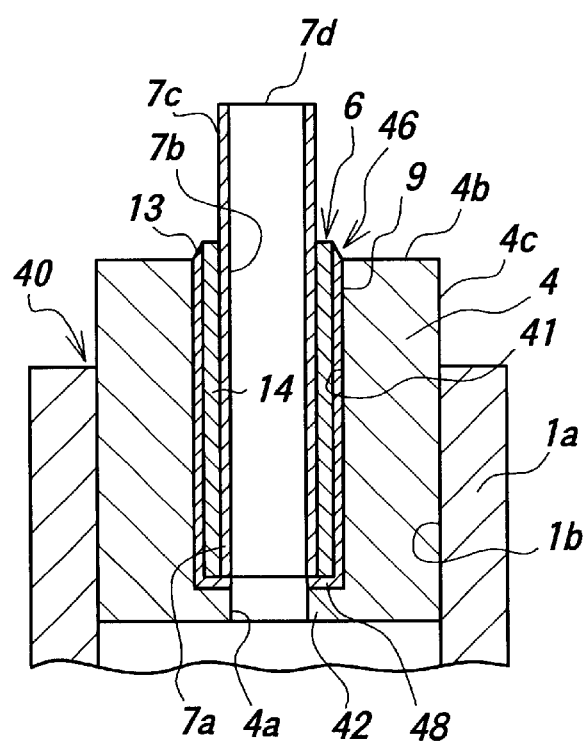

FIGS. 1(*a*), (*b*) to 8 are cross sectional views showing an end portion of a high pressure discharge lamp of the invention.

An inner wall surface 1*b* of an end portion 1*a* of a ceramic high pressure discharge tube 1 is formed so as to extend straightforwardly in the direction of the central axis of the tube. A part of a sealing member 4 is inserted within an opening 40 of the end portion 1*a*. 4*c* is an outer surface and 46 is a through hole-of the sealing member 4.

A depression or hollow 9 is formed on the inner wall surface 4*a* of the sealing member 4. A metal member 7 is held in the hollow 9. In the embodiment, the metal member 7 has a shape of a tube and an opening is formed in its end portion 7*d*, the opening being sealed after introducing a starter gas and an ionizable light-emitting substance. 7*b* is an inner surface and 7*c* is an outer surface of the metal member 7. An inner space of the metal member 7 is commuted with an inner space of the ceramic discharge tube 1 (described below). A protrusion 42 is provided in the sealing member 4 and faces an end portion 7*a* of the metal member 7.

As shown in FIG. 1(*a*), the inventors provided a porous bone structure 2, made of a sintered product of metal powder and with open pores, between the metal member 7 and sealing member 4. A glass material, not shown, was then positioned on the bone structure 2. The melting point of the bone structure 2 is adjusted so as to exceed that of the glass material.

When the glass material was melted, as schematically shown in FIG. 1(*b*), the inventor found that the melted glass was impregnated into the open pores to form main phase 14, comprising the porous bone structure and glass phase impregnated into the open pores. The inventor further found that the thus melted glass is flown into the interface of the sealing member 4 and the main phase 14 so that the bone structure is slightly floated from the surface of the sealing member 4 to form the intermediate glass layer 13. The main phase 14 and intermediate glass layer 13 together form a joining portion 6 joining the metal member 7 and sealing member 4. 41 is a joint interface of the sealing member 4. The joining portion 6 extends to the region near the protrusion 42. A joining glass layer 48 is formed between the protrusion 42 and the end portion 7*a* of the metal member 7.

Figure 2:
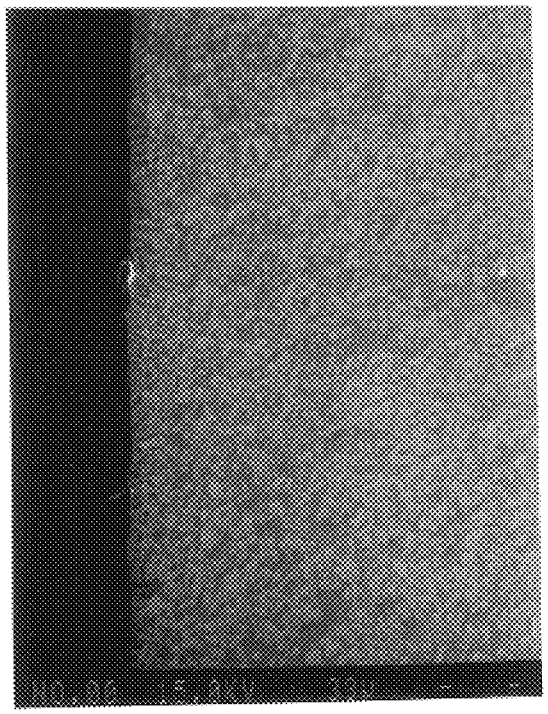
FIG. 2 is a photograph, taken by a scanning type electron microscope, showing the region near the interface between the inner surface of a sealing member 4 and a joining portion.
Figure 3:
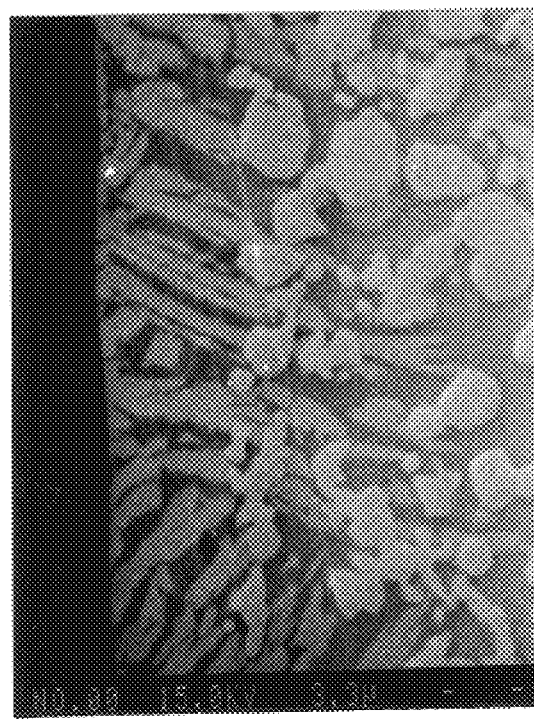
FIG. 3 is a photograph, taken by a scanning type electron microscope, showing an enlarged view of a part of FIG. 2.
Figure 4:
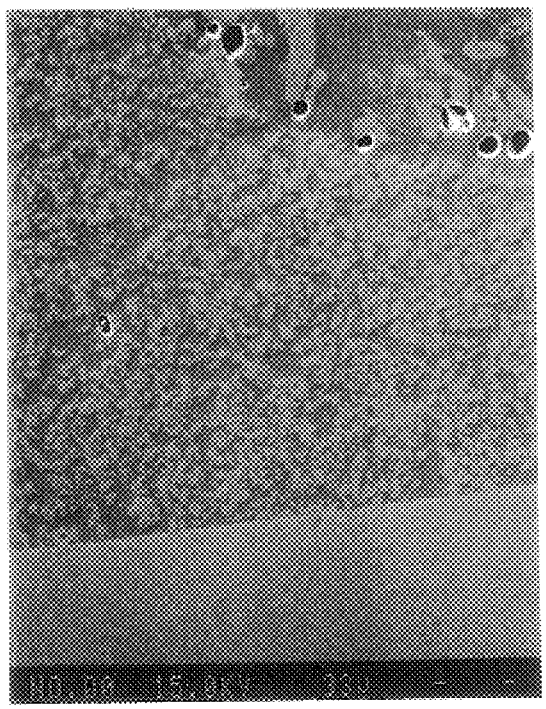
FIG. 4 is a photograph, taken by a scanning type electron microscope, showing the region near the interface of the surface of a metal member 7 and a joining portion, in the embodiment of the invention.
Figure 5:
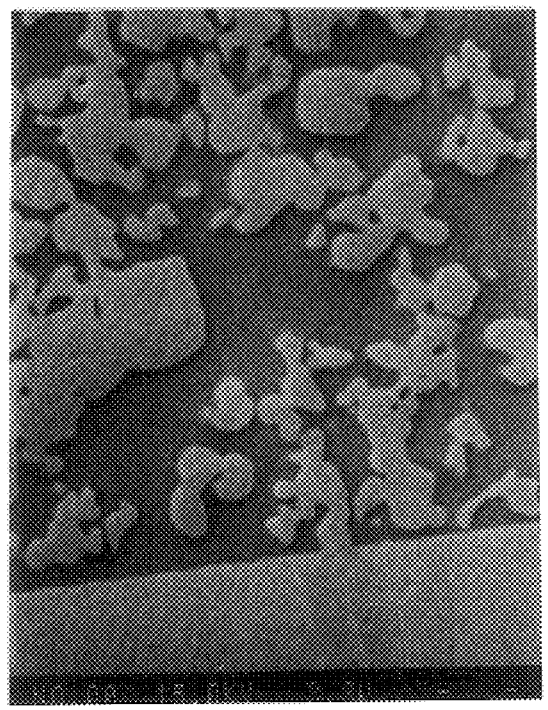
FIG. 5 is a photograph showing an enlarged view of a part of FIG. 4.
Figure 6:
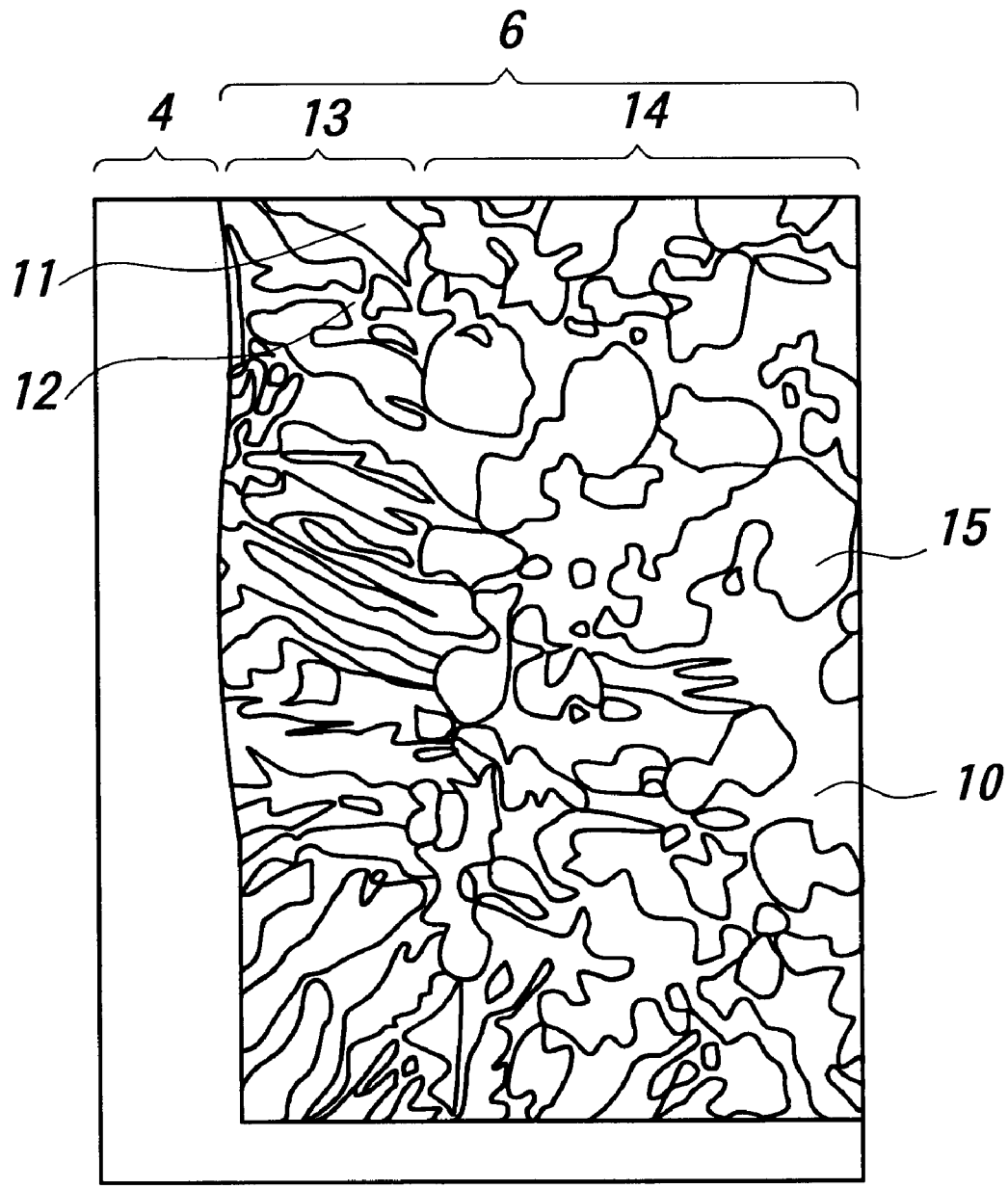
FIG. 6 is a diagram illustrating the photograph of FIG. 3.
Figure 7:
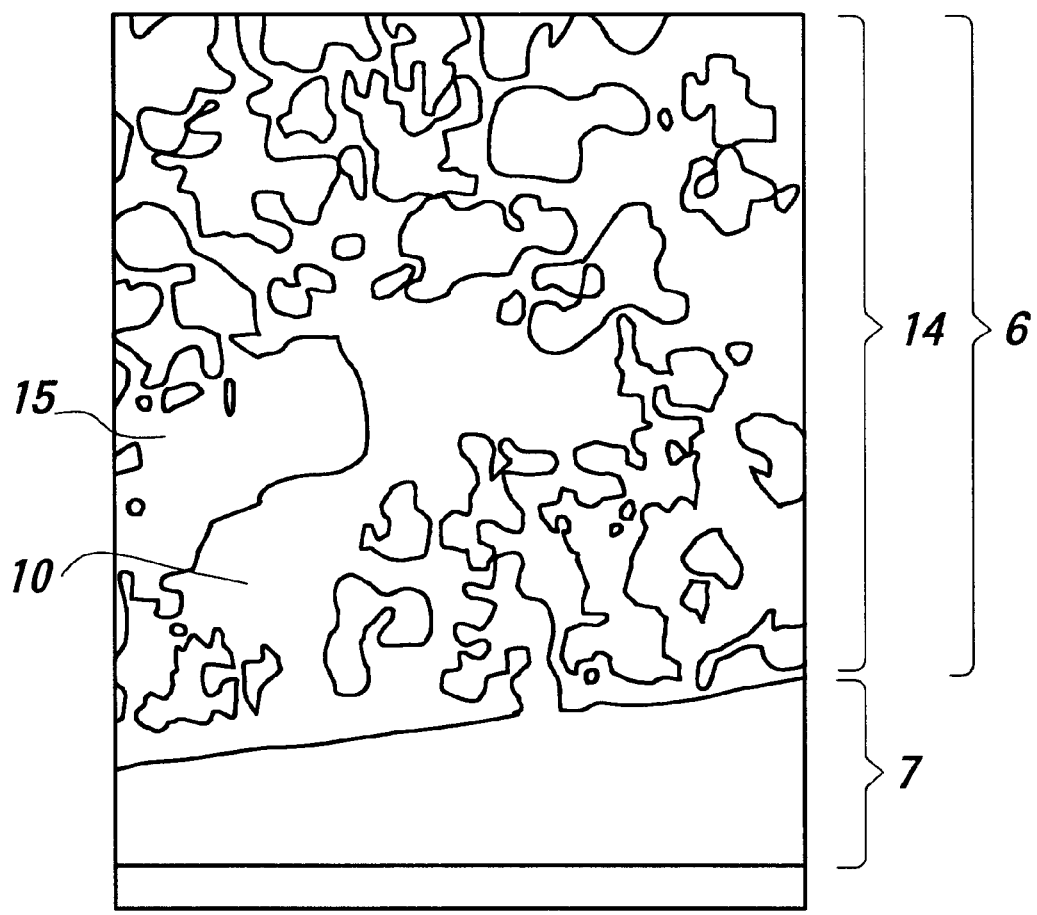
FIG. 7 is a diagram illustrating the photograph of FIG. 5.

Such structure will be explained referring to scanning type microscopic photographs of FIGS. 2, 3, 4 and 5, and line diagrams of FIGS. 6 and 7. FIG. 3 is an enlarged view of the photograph of FIG. 2, and FIG. 6 is a diagram illustrating the photograph of FIG. 3. The intermediate glass layer 13 and main phase 14 is formed on the surface of the sealing member 4. The main phase 14 is composed of the bone structure 15 and the glass phase 10 impregnated into open pores of the bone structure 15. The intermediate glass layer 13 is composed of crystallized glass, having the same composition as the impregnated glass phase 10, with crystalline phases 11 and amorphous phases 12 separated with each other. The reason is that only the easy-to-crystallize components contained in the glass material are actually crystallized in the resultant glass layer. FIG. 5 is an enlarged view showing the photograph of FIG. 4 and FIG. 7 is a diagram illustrating the photograph of FIG. 5. The main phase 14 of the joining portion 6 is formed on the surface of the metal member 7.

In the joined body having the above structure, tensile stress on the glass is dispersed by means of metal particles (porous bone structure) and compression stress on the bone structure is dispersed by means of the glass impregnated into its open pores. That is, the different kinds of materials may cooperate with each other to cope with both of the tensile and compression stresses on the joining portion. Further, cracks may easily develop in the glass material. However, even when cracks develop within the glass phases, such cracks may be interrupted by the porous bone structure made of a metal, thereby preventing the fracture of the joining portion. Further, such main phase comprising the porous bone structure and impregnated glass phase adheres to the metal member and the intermediate glass layer strongly adheres to the sealing member.

Further, glass components susceptible to corrosion are mainly impregnated into the open pores of the bone structure.

Figure 8:
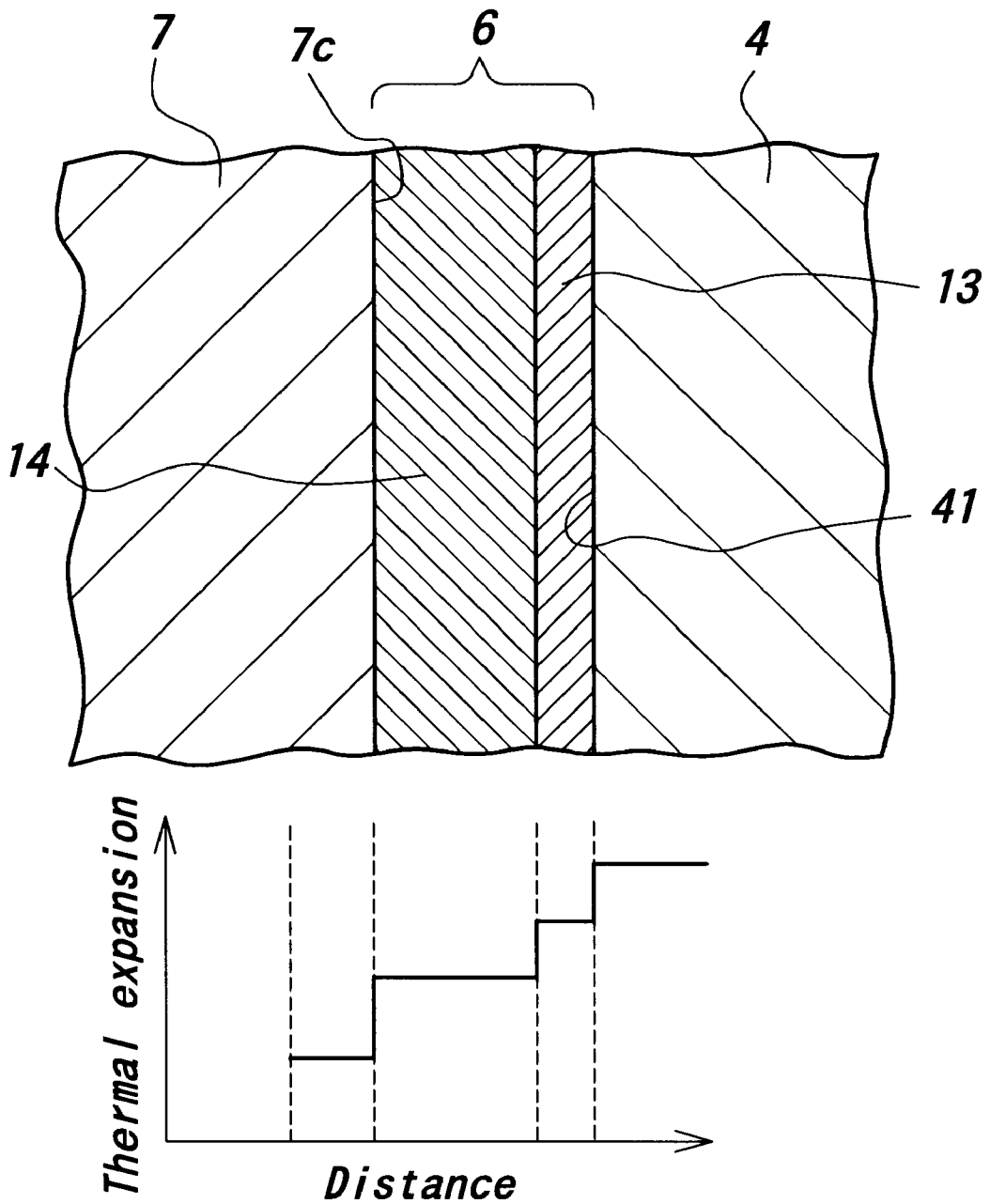
FIG. 8 is a diagram schematically showing the relationship between layered structure of the joining portion of the joined body of figure 1(*b*) and the thermal coefficients of the layers.

Further, the main phase may function as a relaxing layer of the difference of the thermal expansion coefficients of the metal and sealing members, thus improving the resistance to repeated thermal cycles. That is, as shown in the schematic diagram of FIG. 8, when the sealing member 4 has a thermal expansion coefficient larger than that of the metal member 7, the thermal coefficient of the main phase 14 may be near to that of the metal member 7, because the main phase is mainly composed of the metal porous structure. The thermal coefficient of the intermediate glass layer 13 may generally be near to that of the sealing member.

Such joined body is particularly suitable to a high pressure discharge lamp. In this case, such high pressure discharge lamp may be extremely stable to repeated cycles of turning-on and turning-off and a corrosive gas contained within the inner space of a ceramic discharge tube.

Preferably, in this embodiment, sealing and metal members are joined. Further, when the sealing member is not provided, a ceramic discharge tube and a metal member are joined.

The joined structure and method of the invention for directly joining a metal member and a discharge tube may be extremely useful for the miniaturization of a high pressure discharge lamp. That is, the dimension in a direction of the width of the lamp is limited by the dimension of its end portion. However, when inserting a sealing member into the inside of the end portion of the ceramic discharge tube, it is difficult to reduce the dimension of the width of the tube to a dimension smaller than a certain value. Therefore, it is difficult to reduce the volume of the inner space of the tube below a certain value. As a result, actually, when its output is reduced to a level not higher than 25 W, the light-emitting efficiency within the inner space of the tube is considerably reduced. When directly joining the metal member and discharge tube with each other, it is possible to miniaturize a high pressure discharge lamp, thus providing an epoch-making commercial product of a high pressure discharge lamp having a low output level such as not higher than 25 W.

In the invention, preferably, the intermediate glass layer and the impregnated glass phase have the substantially same kind of composition. This means that both belong to the same ingredient system as a whole, thereby improving the strength of the joining portion. The intermediate glass layer and the impregnated glass phase preferably have the substantially same composition. This means that the intermediate glass layer and impregnated glass phase derive from the same glass material. The intermediate glass layer and impregnated glass phases may preferably be partly crystallized, thus improving the joining strength to a ceramic member. The degree of crystallization may preferably be 10% to 50%.

When applying the invention to a high pressure discharge lamp, a metal member is not particularly limited, and may be a member for supporting an electrode system, with the electrode system being directly attached to the member, or a tubular member for inserting another member for supporting an electrode system, with the electrode system also being attached to the supporting member. The latter member is exemplified in the techniques disclosed in Japanese patent publication Kokai (Tokkaihei) 318,435/1994.

The metal member may be made of one or more metal selected from the group consisting of molybdenum, tungsten, rhenium, niobium, tantalum and alloys thereof. Among them, niobium and tantalum have thermal expansion coefficients matching with that of a ceramics, especially alumina ceramics, constituting a ceramic discharge tube. However, it is known that niobium and tantalum are susceptible to corrosion to a metal halide. Therefore, it is desirable to form a metal member by a metal selected from the group consisting of molybdenum, tungsten, rhenium and alloys thereof, for improving the life of the metal member. However, such metals, with high resistance to a metal halide, generally have a low thermal expansion coefficient. For example, alumina ceramics has a thermal expansion coefficient of $8 \times 10^{-6} K^{-1}$, molybdenum has that of $6 \times 10^{-6} K^{-1}$, and tungsten and rhenium have those of not more than $6 \times 10^{-6} K^{-1}$. In such a case, as described above, the inventive joined structure effectively reduce the difference of the thermal expansion coefficients of the metal member and the discharge tube or the sealing member.

When using molybdenum as a material of a metal member, at least one of $La_2O_3$ and $CeO_2$ may preferably be added to molybdenum in a ratio of 0.1 to 2.0 weight percent as a total.

A porous bone structure is made of a sintered product of metal powder. The metal powder may preferably be made of a metal selected from the group consisting of molybdenum, tungsten, rhenium, niobium, tantalum and the alloys thereof. For further improving the resistance of the structure to a halogen, a metal selected from the group consisting of molybdenum, tungsten, rhenium and the alloys thereof is particularly preferable.

The main components of the metals constituting the metal member and constituting the porous bone structure may preferably be the same and more preferably molybdenum. Such main component means that the component constitutes not lower than 60 weight percent of the metal.

The porous bone structure preferably has a porosity, of open pores, of not lower than 30%, and more preferably not lower than 40%, thus improving the strength of the joining portion. The porosity may preferably be not higher than 80%, and more preferably be not higher than 70%, thus effectively impregnating the glass into the open pores of the bone structure and dispersing the stress applied on the structure to improve the resistance thereof to repeated thermal cycles.

For appropriately forming the impregnated glass phase according to the invention, the metal powder, which is a material of the bone structure, preferably has a tap density of 2.5 to 3.5 g/cc.

The second member or sealing member is made of ceramics or cermet. The ceramics may preferably be a ceramic alone, selected from the group consisting of alumina, magnesia, yttria, lanthania and zirconia, or a mixed compound thereof.

More particularly, the sealing member may be made of the same or different kinds of material as that of the ceramic discharge tube. When the electric conductor is made of niobium or tantalum, the ceramic discharge tube and sealing member may preferably be made of the same kind of material, because in this case the thermal expansion coefficient of the electric conductor is approaching those of the ceramic discharge lamp and sealing member. Such same kind of material means that their base components of the ceramic materials are the same and the added component or components may be the same or different from each other.

When the metal member is made of molybdenum, tungsten, rhenium or the alloys thereof, the difference of the thermal expansion coefficients of the ceramic discharge tube and metal member are relatively increased. Therefore, it is preferable to adjust the thermal expansion coefficient of the sealing member between those of the electric conductor and the end portion of the ceramic discharge tube. For that reason, the sealing member may be formed of a cermet.

A cermet is a composite material of ceramics and a metal. Such ceramics may preferably be a ceramic alone, selected from the group. consisting of alumina, magnesia, yttria, lanthania and zirconia, or a mixed compound thereof, and more preferably be the same kind of ceramics as that of the ceramic discharge tube, thereby making it possible to co-fire the ceramic discharge tube and sealing member simultaneously. On this point of view, the ceramic components of the ceramic discharge tube and the cermet may more preferably be alumina ceramics.

The metal component of the cermet may preferably be a metal, having a high temperature melting point and resistance to a metal halide, such as tungsten, molybdenum, rhenium or the like, or the alloys thereof, thus giving the sealing member the improved resistance to the metal halide. The cermet may preferably have not lower than 55 weight percent, and more preferably not lower than 60 weight percent, of a ceramic component (the balance is a metal component).

The intermediate glass layer and/or impregnated glass phase may preferably contain a glass component selected form the group consisting of $Al_2O_3$, $SiO_2$, $Y_2O_3$, $Dy_2O_3$, $B_2O_3$ and $MoO_3$, and more preferably contain $Al_2O_3$ and $SiO_2$. Further, on the viewpoint of wettability, the glass may preferably contains a main component of the ceramics or cermet constituting the second member. The main component means a ceramic component constituting not lower than 70 weight percent of the ceramics or a ceramic component constituting not lower than 60 weight percent of the cermet.

The following is the preferred composition range.

| | |
|---|---|
| $Al_2O_3$ | 10 to 30 weight percent |
| $SiO_2$ | 15 to 40 weight percent |
| $Y_2O_3$ | 0 to 40 weight percent |
| $Dy_2O_3$ | 0 to 70 weight percent |
| $B_2O_3$ | 0 to 5 weight percent |
| $MoO_3$ | 0 to 10 weight percent |

The above described joining method may be applied to both ends of a ceramic tube. However, in one end, it is necessary to apply a tubular-shaped metal member and to introduce an ionizable light-emitting substance through the inner space of the metal member. In the other end, metal members with various shapes such as a rod, a tube or the like may be applied.

The shape of a ceramic discharge tube is not particularly limited, and includes a tube, a cylinder, a barrel or the like. When the metal member is a tubular shaped member supporting an electrode system through which an ionizable light-emitting substance is introduced into the inner space of the discharge tube, the electrode-system-supporting member is sealed by laser welding or TIG welding. When using laser welding, for example, Nd/YAG laser is used.

In the case of a metal halide high pressure discharge lamp, an inert gas, such as argon, a metal halide and optionally mercury is introduced into the inner space of the ceramic discharge tube.

Figure 9:
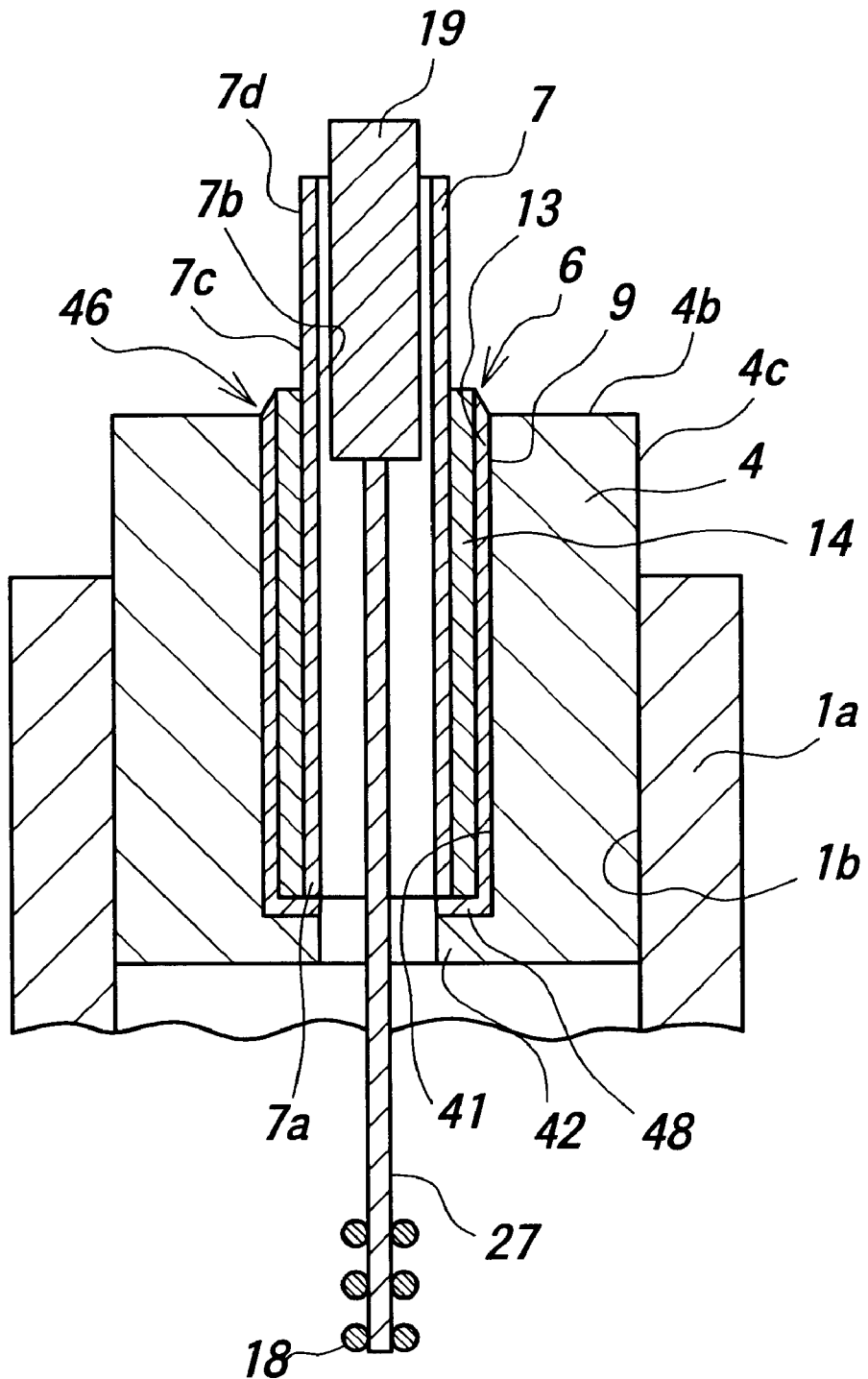
FIG. 9 is a cross sectional view showing the state wherein a clogging member 19 is inserted within the metal member 7 of the high pressure discharge lamp of FIG. 1.
Figure 10:
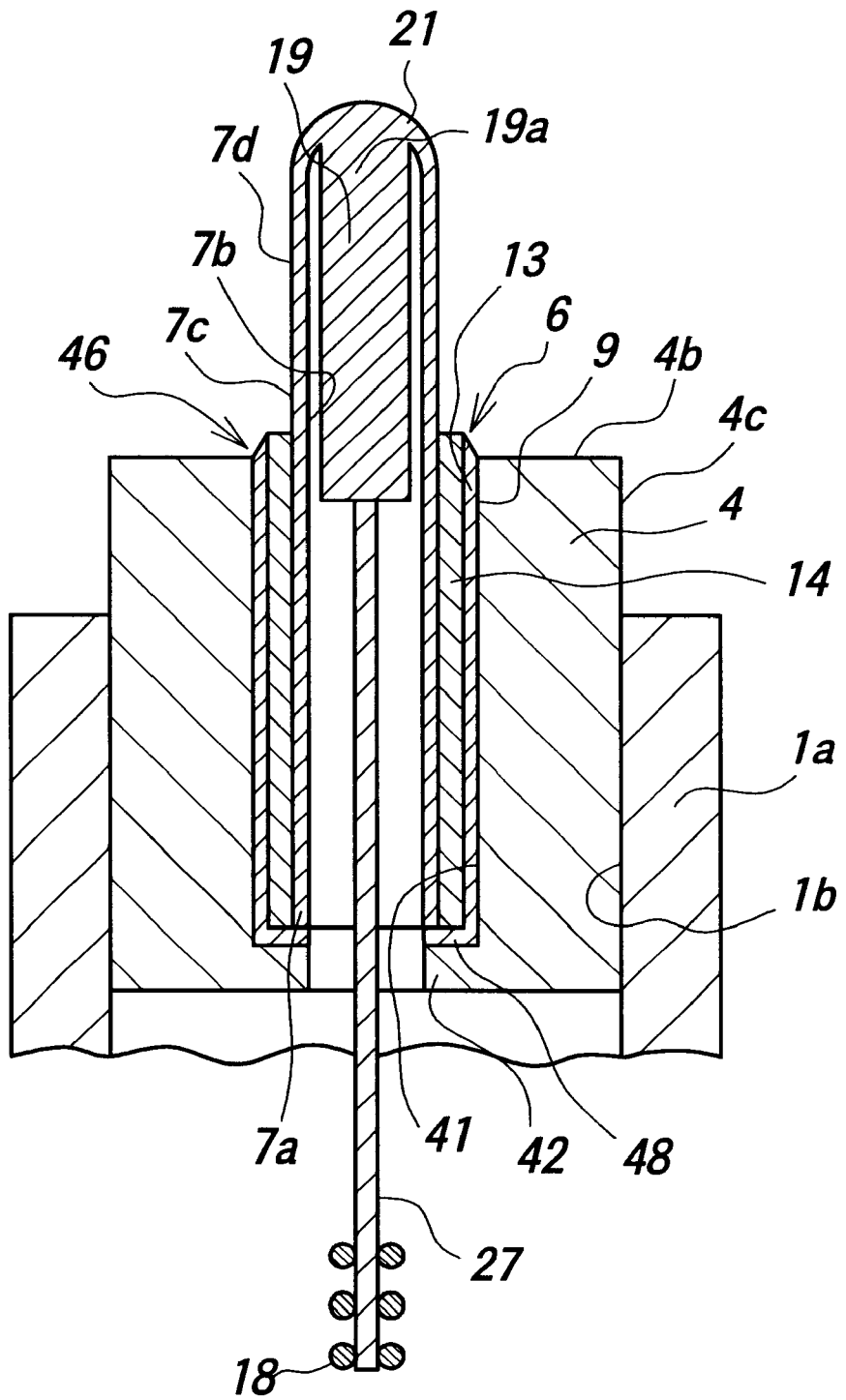
FIG. 10 is a cross sectional view showing a high pressure discharge lamp after the metal member 7 of FIG. 9 and a sealing member 19 is joined to form a sealing portion 21.

FIGS. 1, 9 and 10 show the embodiments of the end portions of the lamp to which the invention is applicable. Further explanation of each portion shown in FIGS. 1 and 8 will be omitted below.

A joining portion 6 of the invention is interposed between a sealing member 4 and a metal member 7 to join them with each other and to secure air-tightness.

As shown in FIG. 9, an axis 27 of an electrode system 18 is attached to a clogging member 19 (preferably made of a metal), the electrode system 18 is inserted into the inner space of a ceramic discharge tube and the clogging member 19 is inserted into the inner space of the metal member 7. As shown in FIG. 10, an end portion 19a of the clogging member 19 is joined, by means of the above welding or the like, to the metal member 7 to form a sealing portion 21, thereby sealing an ionizable light-emitting substance and a starter gas in the inner space of the ceramic discharge tube from the outer atmosphere and providing an electric power to the electrode system through the clogging member 19. A protrusion 42 functions to position the metal member 7 and to make flow path of the corrosive gas longer.

Figure 11:
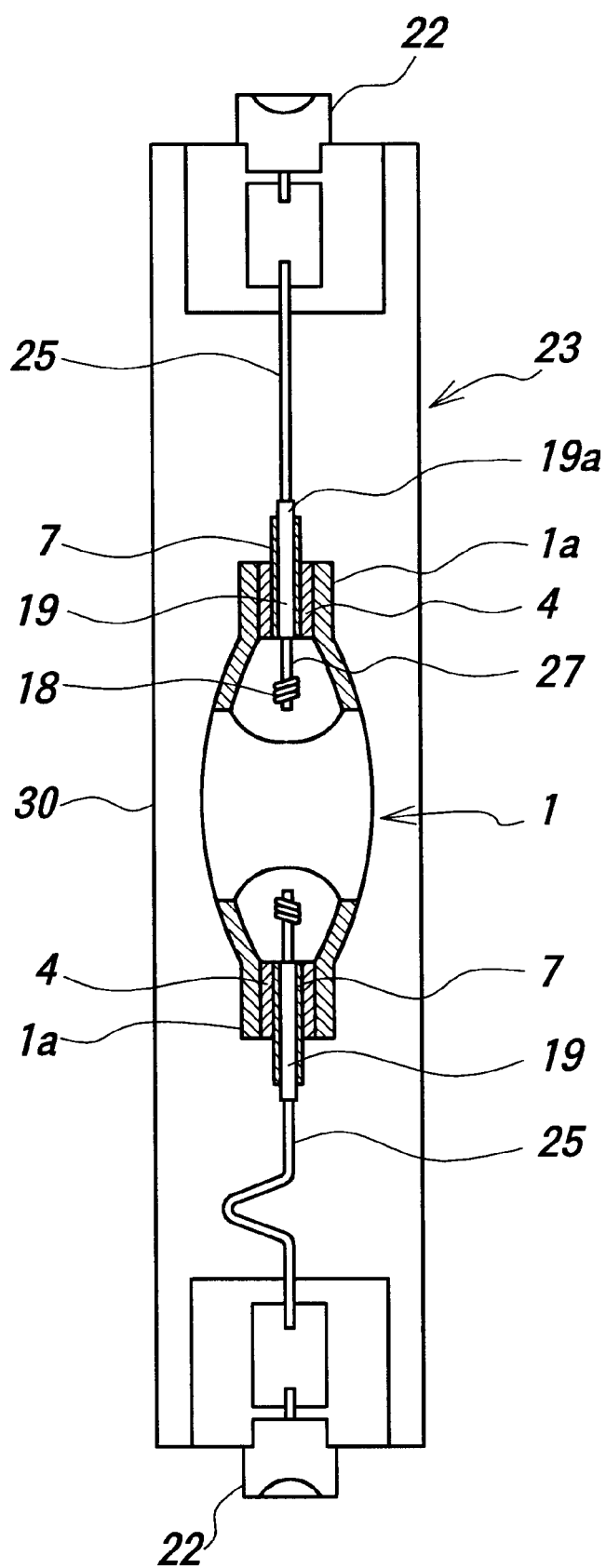
FIG. 11 is a diagram schematically showing an example of a high pressure discharge lamp.

FIG. 11 is a diagram schematically showing an embodiment of a high pressure discharge lamp. Each portion already shown in FIGS. 1, 9 and 10 is assigned the same numeral as that in these figures and the explanation will be omitted.

A high pressure discharge lamp system 23 has an outer tube 30 generally made of a hard glass, in which a high pressure discharge lamp 1 is contained. The outer tube 30 has both ends sealed with ceramic caps. Each clogging member 19 is inserted into and joined with each metal member 7. An outer lead wire 25 is connected with each outer end 19a of each clogging member 19.

Figure 12:
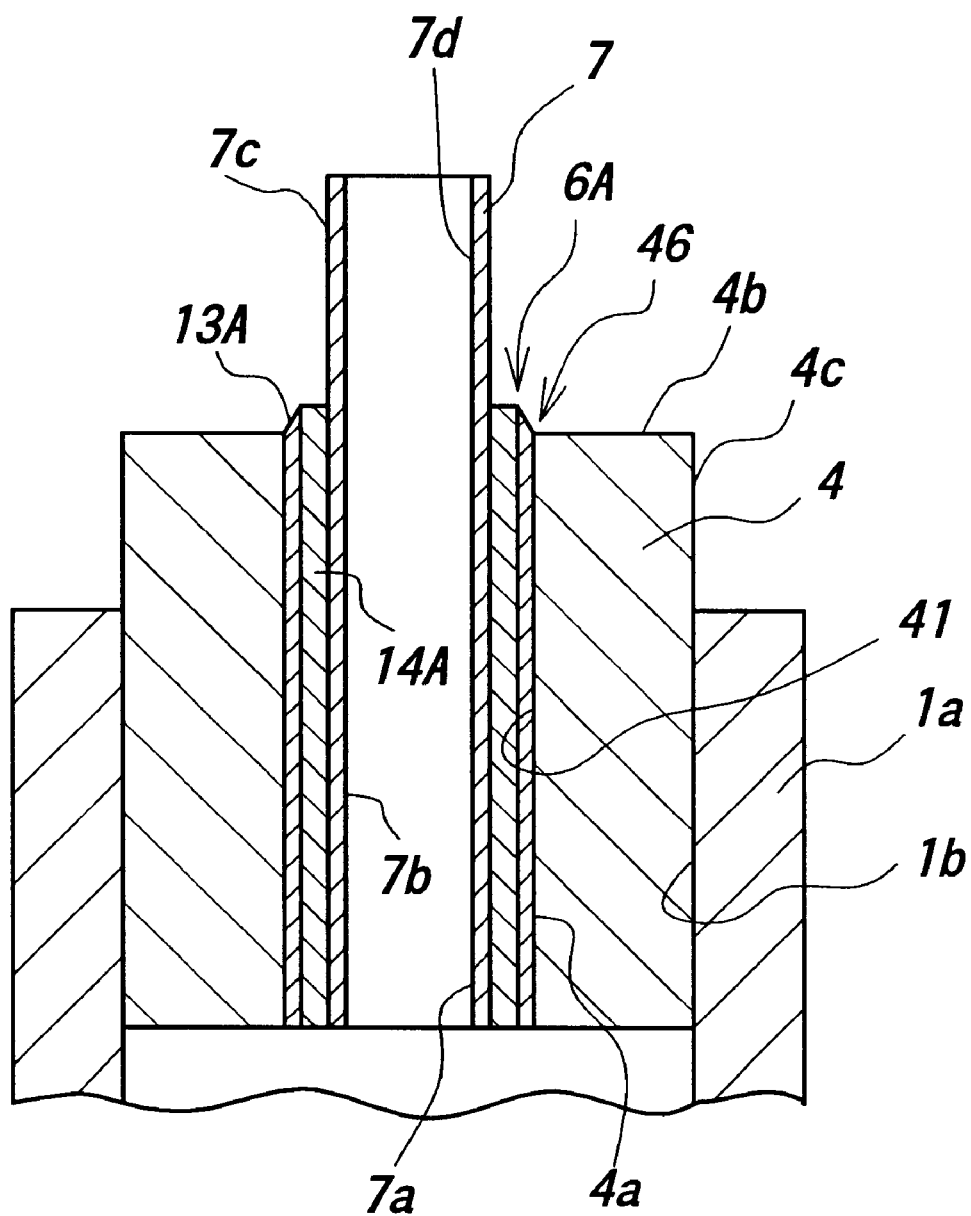
FIG. 12 is a cross sectional view schematically showing an embodiment of an end portion of a high pressure discharge lamp according to the invention, wherein a metal member 7 is joined to the inner wall surface of a sealing member 4 substantially along the full length of the wall.

In the embodiment shown in FIG. 12, the sealing member 4 has no protrusion on its inner wall surface. And, the metal member 7 and the inner wall surface of the sealing member 4 is joined substantially along the full length of the through hole 46 of the sealing member 4. 6A is a joining portion, 13A is an intermediate glass layer and 14A is main phase.

Figure 13:
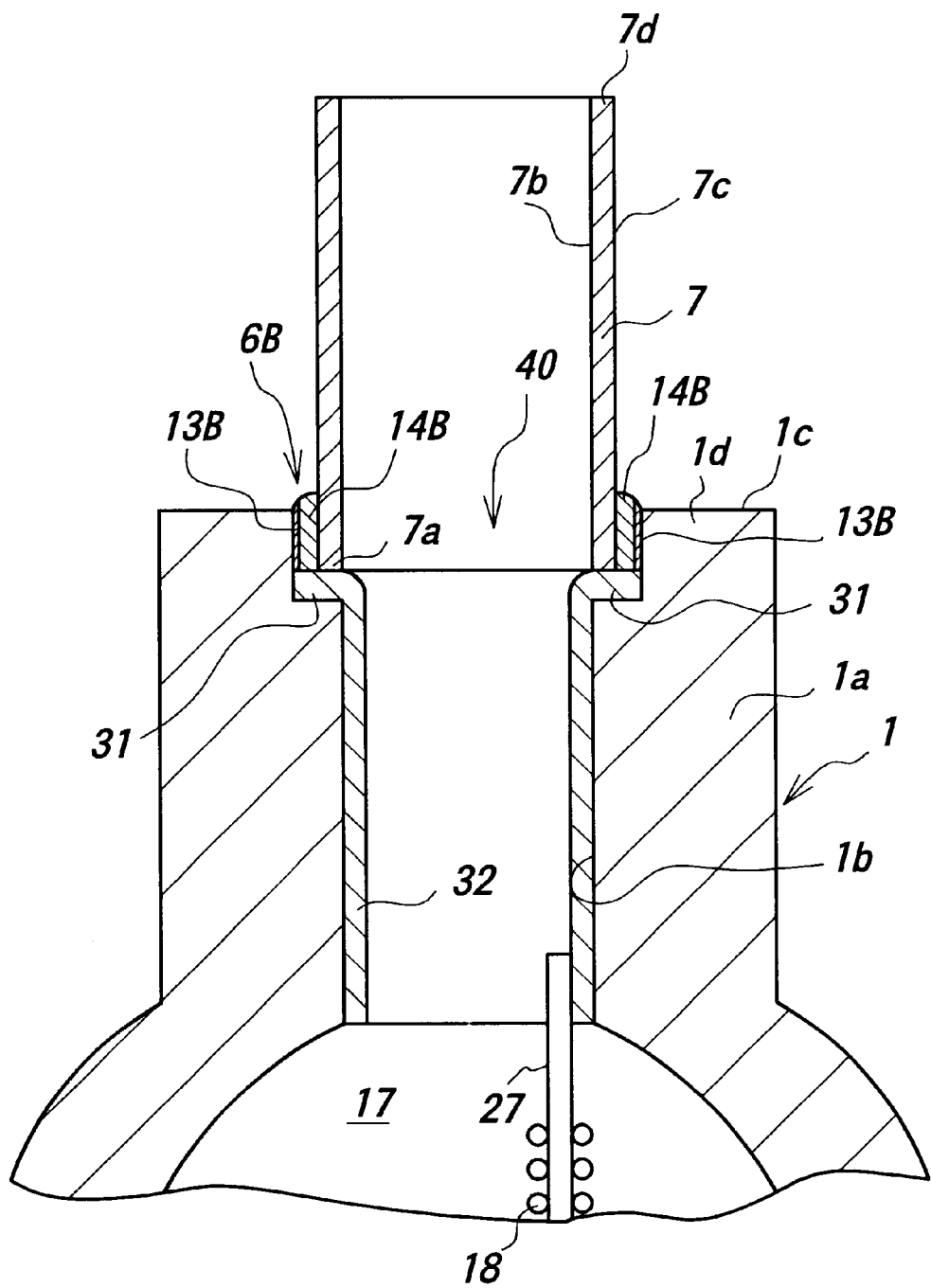
FIG. 13 is a cross sectional view schematically showing an embodiment of an end portion of a high pressure discharge lamp according to the invention, wherein a metal member 7 is joined to an end portion la of a discharge tube 1 and a metal element 7 and a metal axis of an electrode system 27 is electrically connected by a metallized layer 32, covering the surface of the end portion 1*a*.

In the embodiment shown in FIG. 13, the inner wall surface 1b of the end portion 1a of the ceramic discharge tube 1 extends straight-forwardly in the direction of the main axis of the ceramic discharge tube. A hollow 31 is formed in the end portion 1d of the inner wall surface 1b of the end portion 1a. An end portion 7a of a metal member 7 is supported in the hollow 31. A joining portion 6B is interposed between the discharge tube 1 and the metal member 7 and join them with each other in the hollow 31 to secure the air-tightness. 32 is a metallized layer.

Figure 14:
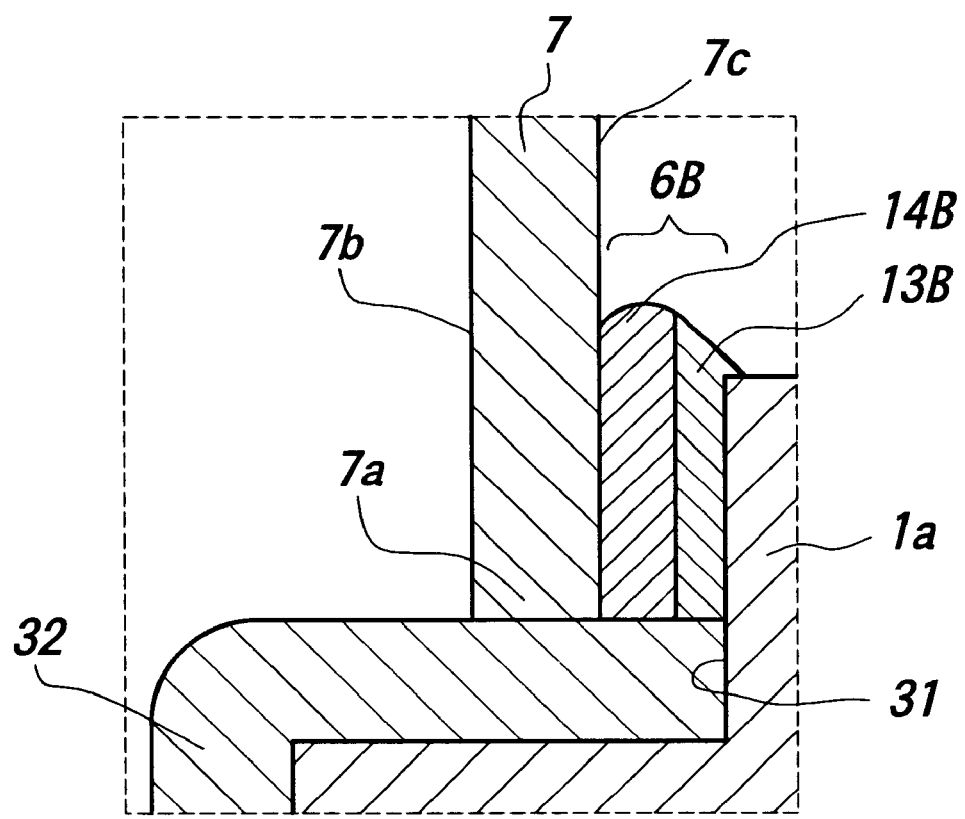
FIG. 14 is an enlarged view showing the region near a hollow 31 shown in FIG. 13.

FIG. 14 is an enlarged view of the region near the hollow 31 shown in FIG. 13. The joining portion 6B comprises main phase 14B contacting the metal member 7 and an intermediate glass layer 13B contacting the discharge tube 1. The metallized layer 32 covers the inner wall surface 1b of the end portion 1a of the discharge tube 1, further covers the surface of the hollow 31, contacts the edge of the end portion 7a of the metal member 7 and extends to the edge of the joining portion 6B.

Figure 15:
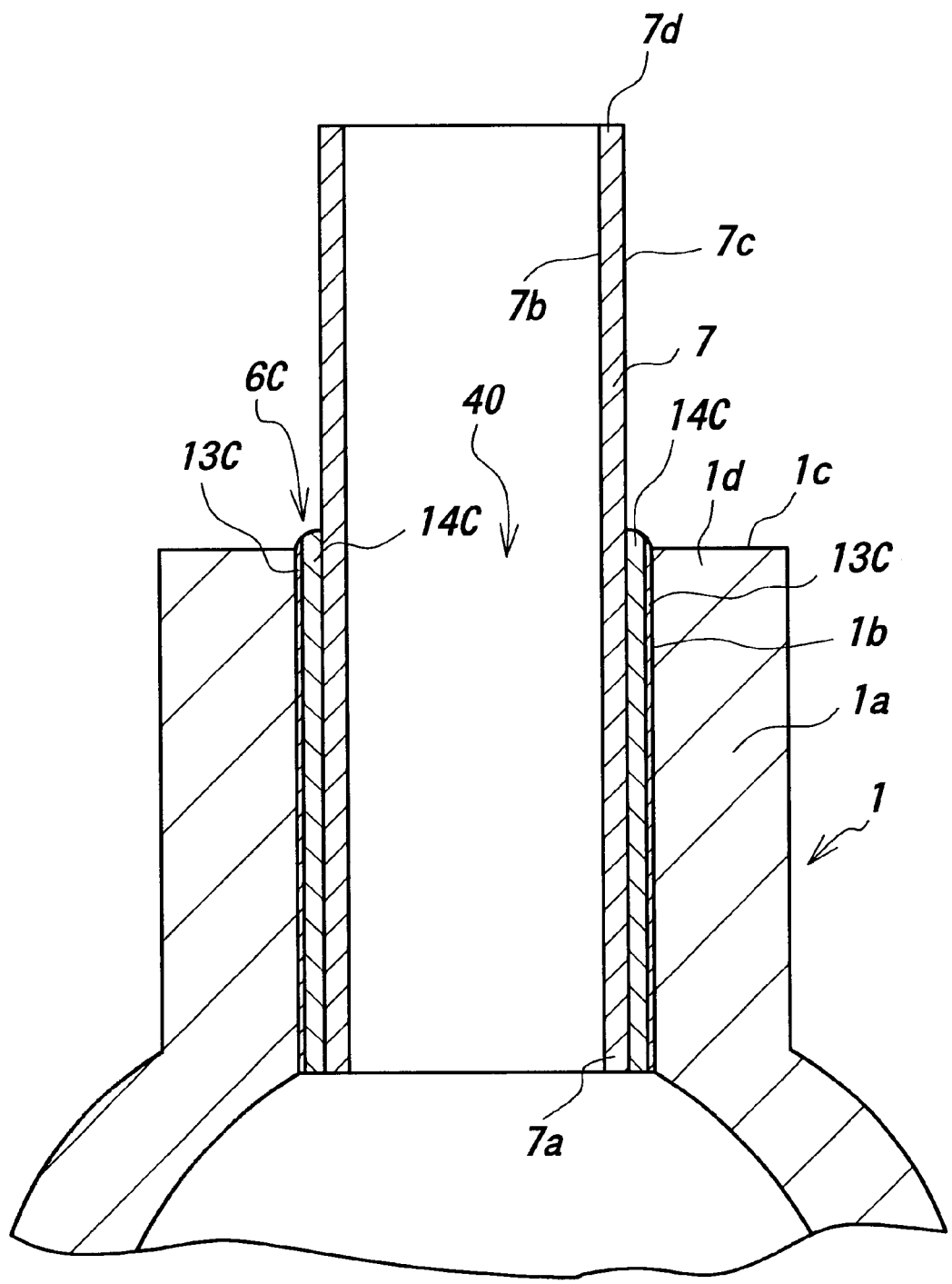
FIG. 15 is a cross sectional view schematically showing an end portion of a high pressure discharge lamp according to another embodiment of the invention, wherein a metal member 7 is joined to an inner wall surface of the end portion 1*a* of a discharge tube 1 substantially along the full length of the surface.

The embodiment of FIG. 15 have no protrusion on the inner wall surface 1b of the end portion 1a of the discharge tube 1 and the inner wall surface 1b extends substantially straightforwardly. The inner wall surface 1b of the end portion 1a and the metal member 7 are joined with each other substantially along the full length of an opening 40 of the end portion 1a. 6C is a joining portion, 13C is an intermediate glass layer and 14C is main phase.

Figure 16:
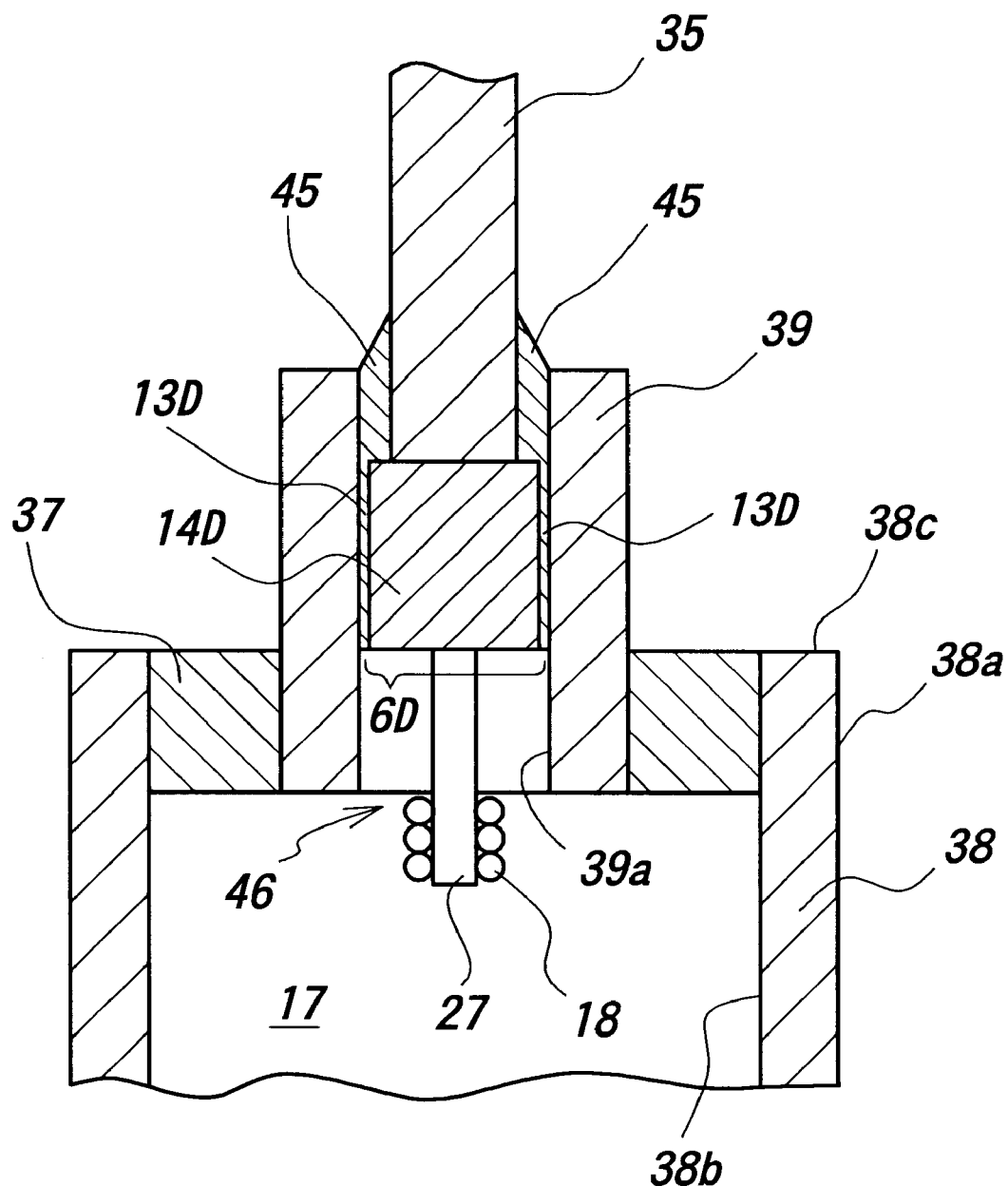
FIG. 16 is a cross sectional view schematically showing an end portion of a high pressure discharge lamp according to another embodiment of the invention, wherein a through hole 46 of a sealing member 39 is sealed by a joining portion 6D of the invention.
Figure 17:
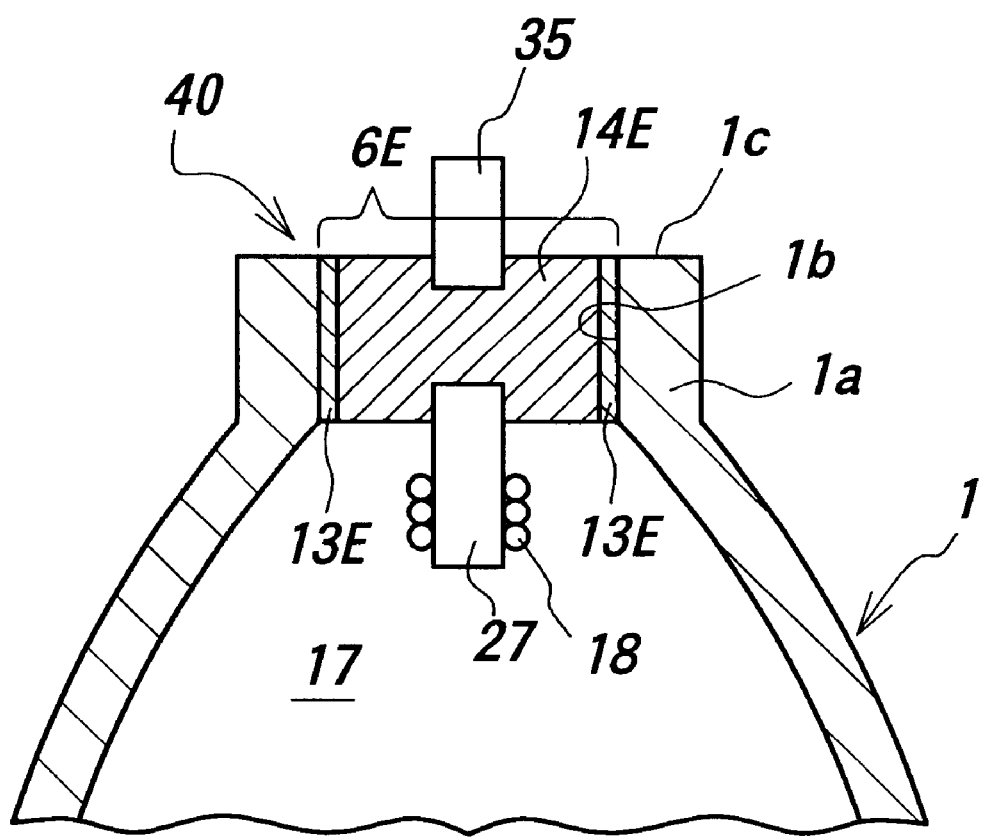
FIG. 17 is a cross sectional view schematically showing an end portion of a high pressure discharge lamp according to another embodiment of the invention, wherein an opening 40 of an end portion 1*a* of a discharge tube 1 is sealed by a joining portion 6E of the invention.

In each embodiment described above, the inventive joining portion is provided between the outer surface of the metal member and the inner wall surface of the end portion of the ceramic discharge tube or the sealing member. In the other words, the above inventive joining portions do not seal the opening in the end portion of the ceramic discharge tube or through hole of the sealing member. However, the inventive joining portion has high resistance to corrosion and therefore may seal the opening of the ceramic discharge tube by itself by contacting the intermediate glass layer with the inner wall surface, facing the opening, and by sealing it with the intermediate glass layer and the main phase with preserved air-tightness. Alternatively, the intermediate glass layer may be contacted with the inner wall surface, facing the through hole of the sealing member, to seal the through hole by this intermediate glass layer and the main phase with preserved air-tightness. In these cases, the metal member is joined to the main phase without passing through the joining portion. FIGS. 16 and 17 relate to such embodiments.

In the embodiment of FIG. 16, a first sealing member 37 is inserted within an inner surface 38b near an end face 38c of the ceramic discharge tube 38 of a high pressure discharge lamp. An outer surface 38a of the discharge tube 38 extend straightforwardly in its longitudinal direction. The thickness of the discharge tube 38 is substantially uniform. A second cylindrical sealing member 39 is inserted within the interior of the first sealing member 37. The sealing members 37 and 39 are made of a ceramics or cermet, same as the sealing members described above. The inventive joining portion 6D is formed within the second sealing member 39.

When forming the joining portion 6D, a porous bone structure is inserted within the sealing member 39. Preferably, a metal member 35 and a metal axis 27, made of molybdenum, is joined to the bone structure in advance. When the outer diameter of the porous bone structure and the inner diameter of the inner wall surface 39a of the sealing member 39 is strictly adjusted to the same value, it might be impossible to insert the bone structure due to the dimension clearance. Preferably, a clearance of 0.05 to 0.10 mm is provided. When inserting the porous bone structure and melting a glass material on the bone structure, the glass is impregnated into the porous bone structure to form main phase 14D and an intermediate glass layer 13D in the clearance of the bone structure and sealing member.

Consequently, the through hole 46 of the sealing member 39 is substantially sealed by the main phase 14D and the intermediate glass layer 13D is formed within the clearance between the main phase 14D and the inner wall surface 39a of the sealing member 39. The axis 27 is joined onto the surface, facing the inner space 17, of the main phase 14D and a metal member 35 is joined to the outer surface of the main phase 14D. A glass layer 45 is further formed within the clearance between the metal member 35 and sealing member 39.

In the embodiment shown in FIG. 17, as shown in FIG. 16, the inventive joining portion 6E is formed within an opening 40 of the end portion 1a of the discharge tube 1.

When forming the joining portion 6E, a porous bone structure is inserted into the inner opening 40 of the end portion 1a of the discharge tube 1. A metal member 35 and a metal axis 27 are joined to the bone structure in advance. A clearance, preferably of 0.05 to 0.10 mm, is provided between the outer surface of the bone structure and the inner surface 1b of the discharge tube 1. When inserting the porous bone structure and melting the glass material on the bone structure, the melted glass is impregnated into the porous bone structure to form main phase 14E and an intermediate glass layer 13E in the clearance between the main phase 14E and the discharge tube 1.

Next, the most preferred process for producing high pressure discharge lamps according to embodiments of the invention will be described. When using a sealing member, powdery raw material (preferably alumina powder) of the sealing member is shaped into a shaped body, with a shape of a ring, of the sealing member. At this stage, it is preferred to press-mold granules, granulated with a spray drier or the like, under a pressure of 2000 to 3000 kgf/cm$^2$. The resulting shaped body may preferably be subjected to dewaxing and calcination to obtain a calcined body, which is then finish-sintered at a temperature between 1600 to 1900° C. under reducing atmosphere of a dew point of –15 to 15° C.

The dewaxing process may preferably be carried out at a temperature of 600 to 800° C. and the calcination process may preferably be carried out at a temperature of 1200 to 1400° C. under reducing atmosphere of hydrogen. The calcination may provide a some degree of strength to the shaped body of the sealing member and facilitate the handling of the sealing member. A hollow may be formed, for example by machining.

Also, metal powder is formulated, crushed, dried, and milled with an added binder, such as ethyl cellulose, acrylic resin or the like, to obtain paste, which is then applied onto the outer surface of the end portion of the metal member and dried at a temperature of 20 to 60° C. The resulting calcined body is sintered under reducing or inert atmosphere or vacuum of a dew point of 20 to 50° C at a temperature of 1200 to 1700° C.

Also, a main body of a ceramic discharge tube is shaped, dewaxed and calcined to obtain a calcined body of the ceramic discharge tube. A pre-sintered body of the sealing member is inserted into the end portion of the resulting calcined body, set at a predetermined position and finish-sintered under reducing atmosphere of a dew point of –15 to 15° C. at a temperature of 1600 to 1900° C. to obtain a ceramic discharge tube.

Also, powder or frit is pre-formulated to a predetermined glass composition, crashed, granulated with an added binder such as polyvinyl-alcohol or the like, press-molded and dewaxed to obtain glass material. Alternatively, powder or frit for a glass is melted and solidified to obtain solid, which is then crashed, granulated with added binder, press-molded and dewaxed. In this case, it is preferred to add 3 to 5 weight percent of a binder to a glass, to press-mold at a pressure of 1 to 5 ton, to dewax at about 700° C. and to calcine at a temperature of 1000 to 1200° C.

Such discharge tube, sealing member, metal member, porous bone structure and glass material are assembled as shown in FIG. 1(a) and heated to a temperature of 1000 to 1600°C. under non-oxidizing atmosphere.

The ceramic discharge lamp as described referring to FIGS. 1 to 8 was produced according to the above process. The ceramic discharge tube and sealing member were made of alumina ceramics, and a pipe made of molybdenum was used as the metal member. Molybdenum powder with an average particle diameter of 3 µm was used, and ethyl cellulose was used as a binder. The molybdenum powder had a tap density of 2.9 g/cc. The composition of the glass was dysprosium oxide 60 weight percent, alumina 15 weight percent and silica 25 weight percent.

The ceramic discharge tube was subjected to a thermal cycle test. Particularly, in one cycle, its temperature was maintained at a room temperature for 15 minutes, increased to 950° C., maintained at 950° C. for 5 minutes and decreased to a room temperature. 1000 thermal cycles were performed. After that, helium leak test was performed to investigate the leakage of helium. The leak rate was not lower than $10^{-10}$ atm · cc · sec. 850° C. is a temperature normally utilized and 950° C. is an overloaded temperature. The resistance to the latter means that the discharge tube may safely preserve a starter gas and an ionizable light-emitting substance therein for a long period of time, even when the gas and substance is introduced into the discharge tube under a pressure higher than a normal value.

Besides, FIG. 2 is a photograph, taken by a scanning type electron microscope, showing the region near the interface between the inner surface of a sealing member 4 and a joining portion, FIG. 3 is a photograph showing an enlarged view of a part of FIG. 2, and FIG. 6 is a diagram illustrating FIG. 3. FIG. 4 is a photograph, taken by a scanning type electron microscope, showing the region near the interface of the surface of a metal member 7 and a joining portion, FIG. 5 is an enlarged view of a part of FIG. 4, and FIG. 7 is a diagram illustrating FIG. 5.

When a sealing member is not applied in a high pressure discharge lamp, a main body of a ceramic discharge tube is shaped to obtain a shaped body, which is then dewaxed, calcined and finish-sintered. Also, paste of metal powder is produced as described above, applied or printed onto the surface of a metal member and subjected to heat treatment to form a porous bone structure. After the discharge tube and metal member are assembled and the above described glass material is set, they are heat-treated as described above to obtain a high pressure discharge lamp.

The inventive joined body and joining method may be widely applied to, other than a high pressure discharge lamp, all the structural bodies, such as a switching device, having a conductive portion or terminal whose air-tightness at a high temperature of about 900° C. is indispensable.

The present invention has been explained referring to the preferred embodiments, however, the present invention is not limited to the illustrated embodiments which are given by way of examples only, and may be carried out in various modes without departing from the scope of the invention.

What is claimed is:

1. A joined body comprising a first member made of a metal, a second member made of a ceramic or a cermet, and a joining portion interposed between said first member and said second member for joining said first and second members, said joining portion comprising a main phase contacting said first member and an intermediate glass layer contacting said second member and existing between said second member and said main phase, said main phase comprising a porous bone structure having open pores, said porous bone structure comprising a sintered product of metal powder, and a glass phase impregnated into said open pores of said porous bone structure;

said metal powder comprising at least one metal selected from the group consisting of molybdenum, tungsten, rhenium, niobium, tantalum and alloys thereof.

2. The joined body as claimed in claim 1, wherein said intermediate glass layer and said impregnated glass phase comprise a main component of said ceramic or said cermet constituting said second member.

3. The joined body as claimed in claim 1, wherein said metal constituting said porous bone structure comprises a main component of said metal constituting said first member.

4. The joined body as claimed in claim 2, wherein said intermediate glass layer and said impregnated glass phase comprise the same ingredient system.

5. The joined body as claimed in claim 3, wherein said intermediate glass layer and said impregnated glass phase comprise the same ingredient system.

6. The joined body as claimed in claim 1, wherein said porous bone structure has a porosity of open pores in a range of 30% to 80%.

7. The joined body as claimed in claim 3, wherein said porous bone structure has a porosity of open pores in a range of 30% to 80%.

8. A high pressure discharge lamp comprising:

a ceramic discharge tube having an inner space formed therein and end portions, said inner space being filled with an ionizable light-emitting material and a starter gas and an opening being formed within at least one of said end portions;

an electrode system provided within said inner space;

a sealing member having a through hole formed therein, a part of said sealing member being fixed within said opening of said end portion of said ceramic discharge tube; and a metal member, wherein said metal member and said sealing member constitute an air-tight joined body comprising said joined body as claimed in claim 1, said metal member comprising said first member and said sealing member comprising said second member.

9. The high pressure discharge lamp as claimed in claim 8, wherein at least a part of said metal member is inserted into said through hole, said sealing member further comprising a joining surface joined with said metal member and a protrusion provided between an edge of said metal member and said inner space of said discharge tube on an inner side facing said through hole, said lamp further comprising an adhesive glass layer between said edge of said metal member and said protrusion.

10. The high pressure discharge lamp as claimed in claim 8, wherein at least a part of said metal member is inserted into said through hole and an inner wall surface, facing said through hole of said sealing member, is joined to said metal member along the full length of said inner wall surface.

11. The high pressure discharge lamp as claimed in claim 8, wherein at least a part of said metal member is inserted into said through hole and a part of an inner wall surface of said sealing member is joined to said metal member through said joining portion, said lamp further comprising a metallized layer on a region of said inner wall surface where said joining portion is not provided, and said metallized layer comprising an end portion, on a side of said inner space of said discharge tube, being electrically connected with said electrode system.

12. The high pressure discharge lamp as claimed in claim 8, wherein said intermediate glass layer is contacted with an inner wall surface, facing said through hole, of said sealing member, wherein said intermediate glass layer and said main phase air-tightly seal said through hole, and wherein said metal member is joined with said main phase without said metal member passing through said joining portion.

13. A high pressure discharge lamp comprising:
- a ceramic discharge tube with an inner space formed therein and end portions, said inner space being filled with an ionizable light-emitting material and a starter gas and an opening being formed within at least one of said end portions;
- an electrode system provided within said inner space; and
- a metal member, wherein said metal member and said ceramic discharge tube constitute an air-tight joined body comprising said joined body as claimed in claim 1, said metal member comprising said first member and said ceramic discharge tube comprising said second member.

14. The high pressure discharge lamp as claimed in claim 13, wherein at least a part of said metal member is inserted into said opening, said ceramic discharge tube further comprising a joining surface joined with said metal member and a protrusion provided between an edge of said metal member and said inner space of said discharge tube on an inner side facing said opening, and said lamp further comprising an adhesive glass layer between said edge of said metal member and said protrusion.

15. The high pressure discharge lamp as claimed in claim 13, wherein at least a part of said metal member is inserted into said opening and an inner wall surface facing said opening of said ceramic discharge tube is joined to said metal member along the full length of said inner wall surface.

16. The high pressure discharge lamp as claimed in claim 13, wherein at least a part of said metal member is inserted into said opening and a part of an inner wall surface of said ceramic discharge tube is joined to said metal member through said joining portion, said lamp further comprising a metallized layer on a region of said inner wall surface where said joining portion is not provided thereon, and said metallized layer comprising an end portion, on the side of said inner space of said discharge tube, being electrically connected with said electrode system.

17. The high pressure discharge lamp as claimed in claim 13, wherein said intermediate glass layer is contacted with an inner wall surface of said ceramic discharge tube, said inner wall surface facing said opening, wherein said intermediate glass layer and said main phase seal air-tightly said opening, and said metal member is joined with said main phase without said metal member passing through said joining portion.

* * * * *